United States Patent [19]

McCormack

[11] Patent Number: 5,518,286

[45] Date of Patent: May 21, 1996

[54] TAILGATE

[76] Inventor: John E. McCormack, 773 Shanahan Blvd., Newmarket, Ontario, Canada, L3X 1P9

[21] Appl. No.: 354,338

[22] Filed: Dec. 12, 1994

[30] Foreign Application Priority Data

May 20, 1994 [CA] Canada ..................... 2124037

[51] Int. Cl.$^6$ ..................... B62D 35/00
[52] U.S. Cl. ..................... 296/57.1; 296/180.1
[58] Field of Search ............ 296/50, 57.1, 180.1, 296/51

[56] References Cited

U.S. PATENT DOCUMENTS

| | | | |
|---|---|---|---|
| D. 250,014 | 10/1978 | Jensen | D12/196 |
| 4,063,772 | 12/1977 | Kincaid | 296/1 S |
| 4,136,905 | 1/1979 | Morgan | 296/57.1 X |
| 4,165,118 | 8/1979 | Jensen | 296/50 |
| 4,353,589 | 10/1982 | Hartberg | 296/50 |
| 4,372,601 | 2/1983 | Smith | 296/50 |
| 4,416,482 | 11/1983 | Patterson | 296/50 X |
| 4,475,759 | 10/1984 | Wine | 296/1 S |
| 4,743,058 | 5/1988 | Fedrigo | 296/57.1 |
| 4,861,093 | 8/1989 | Chapman | 296/57.1 X |
| 4,902,066 | 2/1990 | Norman | 296/57.1 X |
| 4,932,705 | 6/1990 | Miller | 296/50 |
| 5,273,339 | 12/1993 | Flynn | 296/50 X |
| 5,324,092 | 6/1994 | Burg | 296/50 X |

Primary Examiner—Joseph D. Pape
Attorney, Agent, or Firm—Mark B. Eisen

[57] ABSTRACT

A tailgate for an open bed truck is provided in the form of a tubular grate, with openings between tubes to allow wind to flow through the tailgate even when it is closed, improving fuel economy. The openings provide defined passages in which long articles can be supported, and an optional solid panel can be secured to the front face of the tailgate to retain loose loads.

11 Claims, 3 Drawing Sheets

TAILGATE

FIELD OF INVENTION

This invention relates to tailgates for light trucks and the like. In particular, this invention relates to an improved tailgate offering decreased wind resistance and versatility in the loading and transportation of materials in a truck bed.

BACKGROUND OF THE INVENTION

Light trucks having an open truck bed, also known as "pickup trucks", are a popular vehicle for personal and commercial transportation uses. The large area of the truck bed offers ample space for stowing and transporting items of many shapes and sizes, and the relatively similar size of the truck to that of a large car permits maneuverability and ease of use that makes these trucks suitable for both personal and commercial purposes.

However, the truck bed in a pickup truck is of a limited length, which makes it difficult to transport long articles such as lumber, pipes and many other articles which are frequently desired to be transported in these trucks. Users resort to leaning long articles on the top of the tailgate, or leaving the tailgate open, both of which present problems in fastening the load securely in the truck bed.

Moreover, because the truck bed generally has an open top the tailgate provides a significant amount of wind resistance, which reduces fuel economy and can under certain circumstances render controlling the truck more difficult. Again, users will often leave the tailgate open when driving to avoid this problem (where the load does not require that the tailgate be closed), which increases the effective length of the truck and can present a hazard to other drivers.

The present invention overcomes these disadvantages by providing a tailgate in the form of a tubular grate. The openings between tubes allow wind to flow through the tailgate even when it is closed, improving fuel economy without sacrificing safety or the ability to secure a load from shifting sideways or falling off of the back of the truck. Furthermore, the openings provide well defined passages through which long articles such as lumber and pipes can be passed, the tubes of the tailgate serving both to keep such loads from shifting sideways in the truck bed and to provide a frame against which the articles can be tied to prevent slippage off of the back of the truck bed.

The tailgate of the present invention is provided with an optional solid panel, which can be secured to the front face of the tailgate to retain loose loads such as sand, soil, gravel, etc. This panel can be of plastic or other similar material, and is preferably corrugated for increased strength. The optional panel can be stored behind the seat in the cab, or in any other convenient location, until needed.

The present invention thus provides a tailgate for a truck having side and front walls and a floor defining a truck bed, comprising a plurality of horizontal members extending between side rails in spaced relation, a plurality of vertical members extending between the horizontal members in spaced relation, hinge means adjacent to a bottom of the side rails for mounting the tailgate between rear edges of the side walls, such that the tailgate can swing between an open position substantially parallel to the truck bed and a closed position abutting a rear edge of the side walls, and latch means for latching the tailgate in a closed position.

BRIEF DESCRIPTION OF THE DRAWINGS

In drawings which illustrate by way of example only a preferred embodiment of the invention.

DETAILED DESCRIPTION OF THE INVENTION

Figure 1:
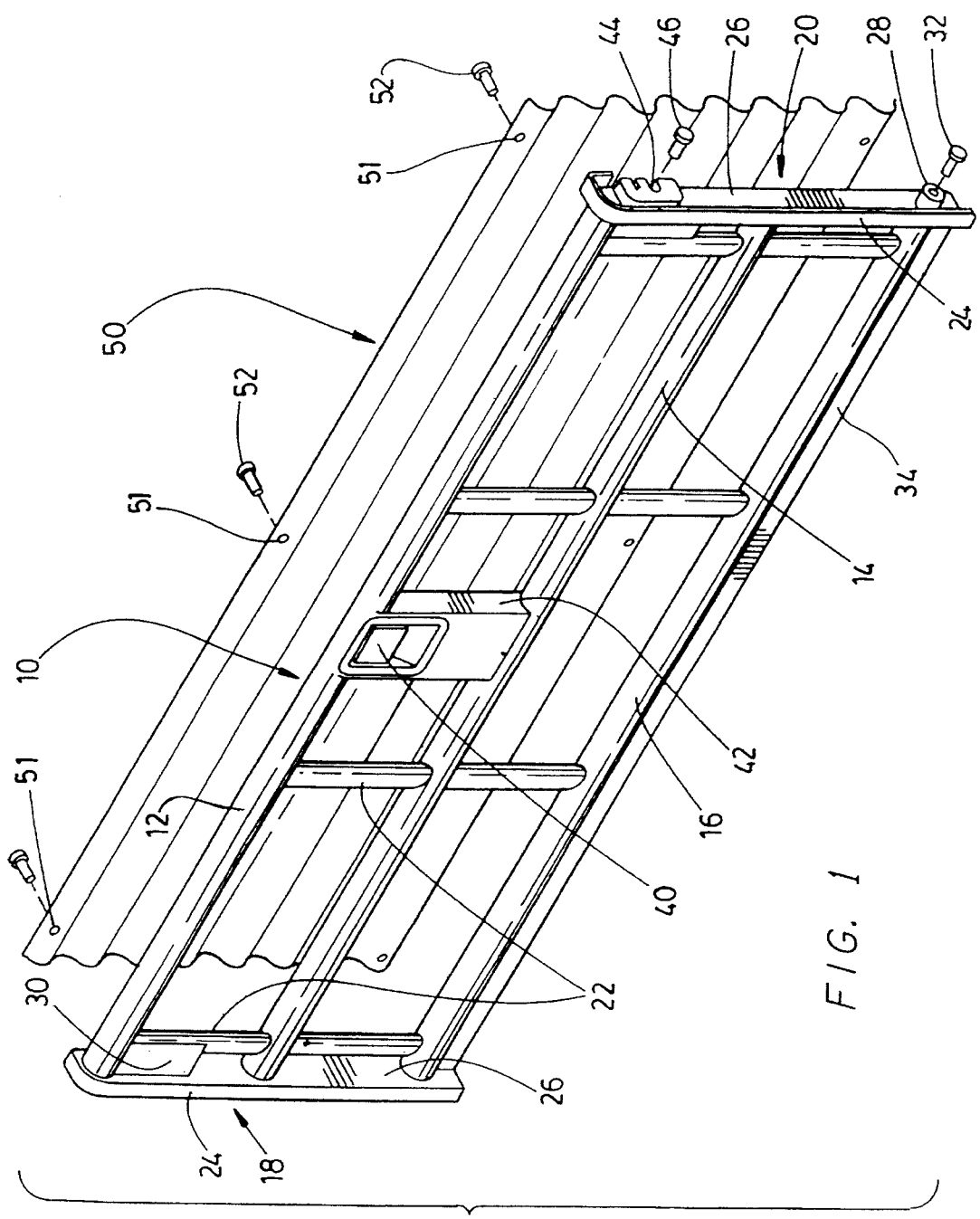
FIG. 1 is a rear perspective view of the tailgate of the present invention.
Figure 2:
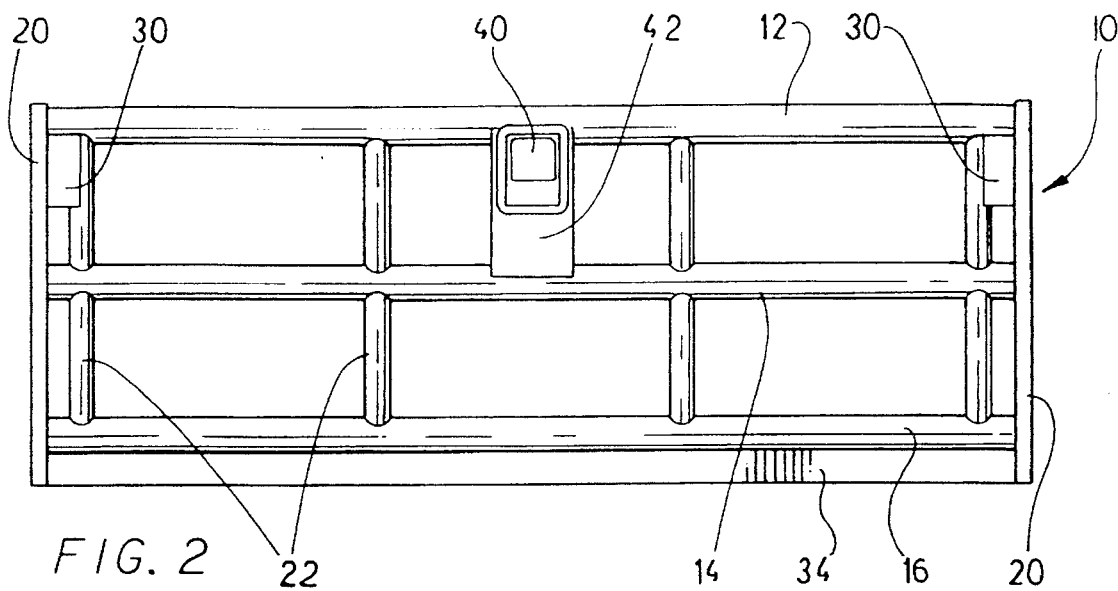
FIG. 2 is a rear elevation of the tailgate.

Referring to FIG. 1, a preferred embodiment of the tailgate 10 has a plurality of horizontal members including a top member 12, a middle member 14 and a bottom member 16 extending between side rails 18,20. The horizontal members 12,14,16 are preferably formed from steel tubes and are welded or otherwise affixed to the side rails 18,20 with substantially even spacing between members. Cylindrical tubes are preferred for decreased wind resistance, and the tubes are hollow to reduce the weight of the tailgate 10. Any other suitably strong, weather-resistant material, such as plastic, may also be used.

A plurality of vertical members 22 extends between the horizontal members 12 and 14 and between the horizontal members 14 and 16. The vertical members are also preferably formed from steel tubes, and may be smaller in diameter than the horizontal members 12,14,16. The vertical members 22 are welded or otherwise affixed to the horizontal members 12,14,16 with substantially even spacing between members 22.

The side rails 18,20 each comprise a front flange 24 extending orthogonally from a main plate 26 to which the horizontal members 12,14,16 are affixed. The flange 24 serves to conceal a clearance between the main plate 26 and the sides of the truck body which allows the tailgate 10 to open and close freely, and to conceal the latch 44 and hinge 28, described below. If desired, a reinforcing steel brace 30 may be welded between the side-most vertical members 22 and the main plates 26 of the side rails 18,20.

An annular hinge socket 28 projects from a lower portion of the main plate 26, which mates with a hinge pin 32 projecting from the truck body for mounting the tailgate in a conventional fashion. The hinge pin 32 may extend beyond the main plate 26, and as such it is aesthetically preferred to align the hinge socket 28 with the bottom member 16, to conceal the end of the hinge pin 32. A bottom flange 34 may be welded along the bottom member 16 to conceal the gap between the bottom member 16 and the truck bed.

Figure 3:
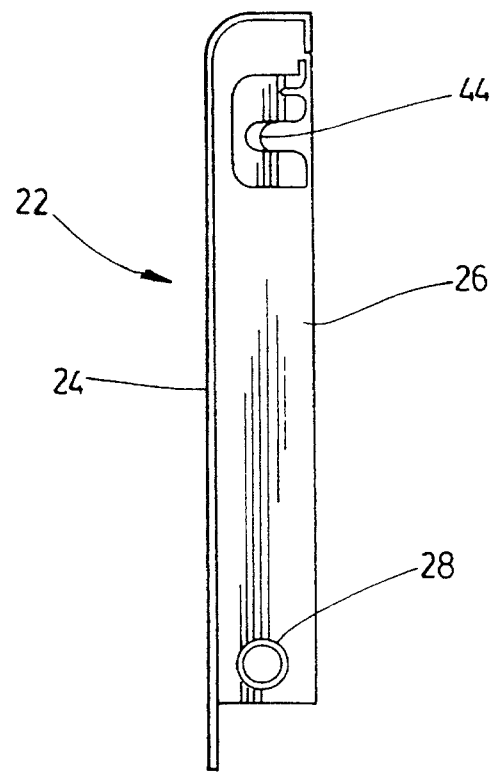
FIG. 3 is a side elevation showing details of the hinge and latch.

The tailgate uses a conventional latch mechanism which includes a handle 40 mounted in a housing 42 secured between the top and middle members 12,14 centrally in the tailgate. A pair of cables (not shown) extends from the handle through the top member 12 and through each of the side rails 20 to a standard toggle latch 44, shown in FIG. 3. The toggle latch 44 mates with latch pin 46 projecting from the truck body to maintain the tailgate in a vertical (closed) position. A pair of standard tension cables (not shown) anchored to the truck body and to the side rails 20 prevents the tailgate 10 from opening beyond a position substantially parallel to the truck bed.

Figure 4:
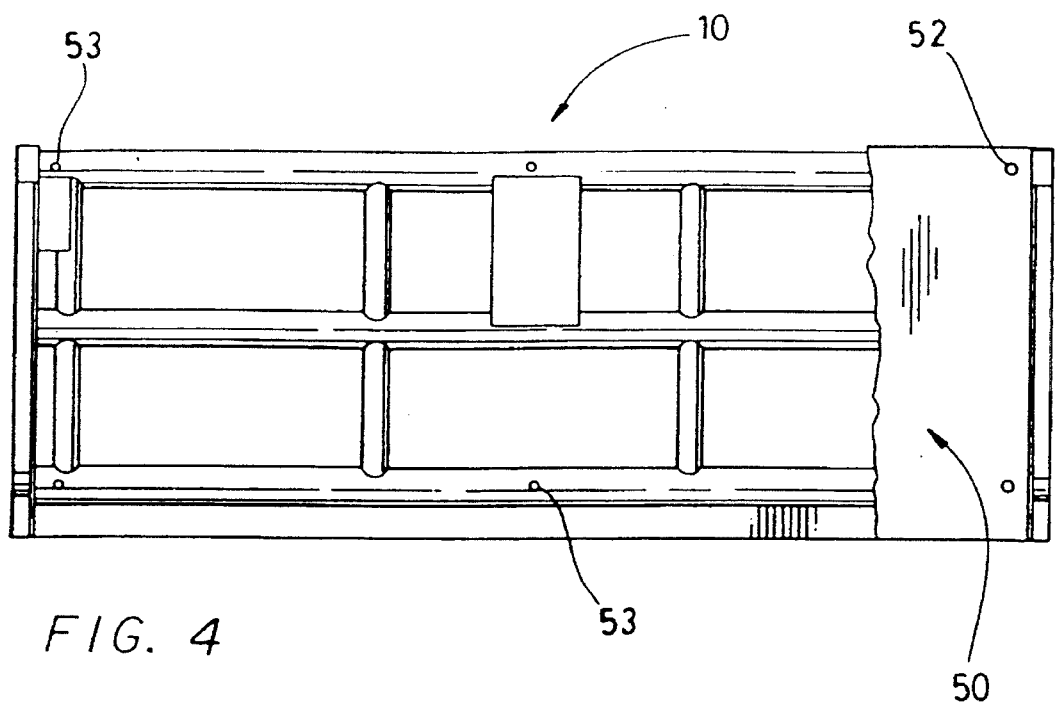
FIG. 4 is a front elevation of the tailgate showing the optional plastic panel in cutaway.
Figure 5:
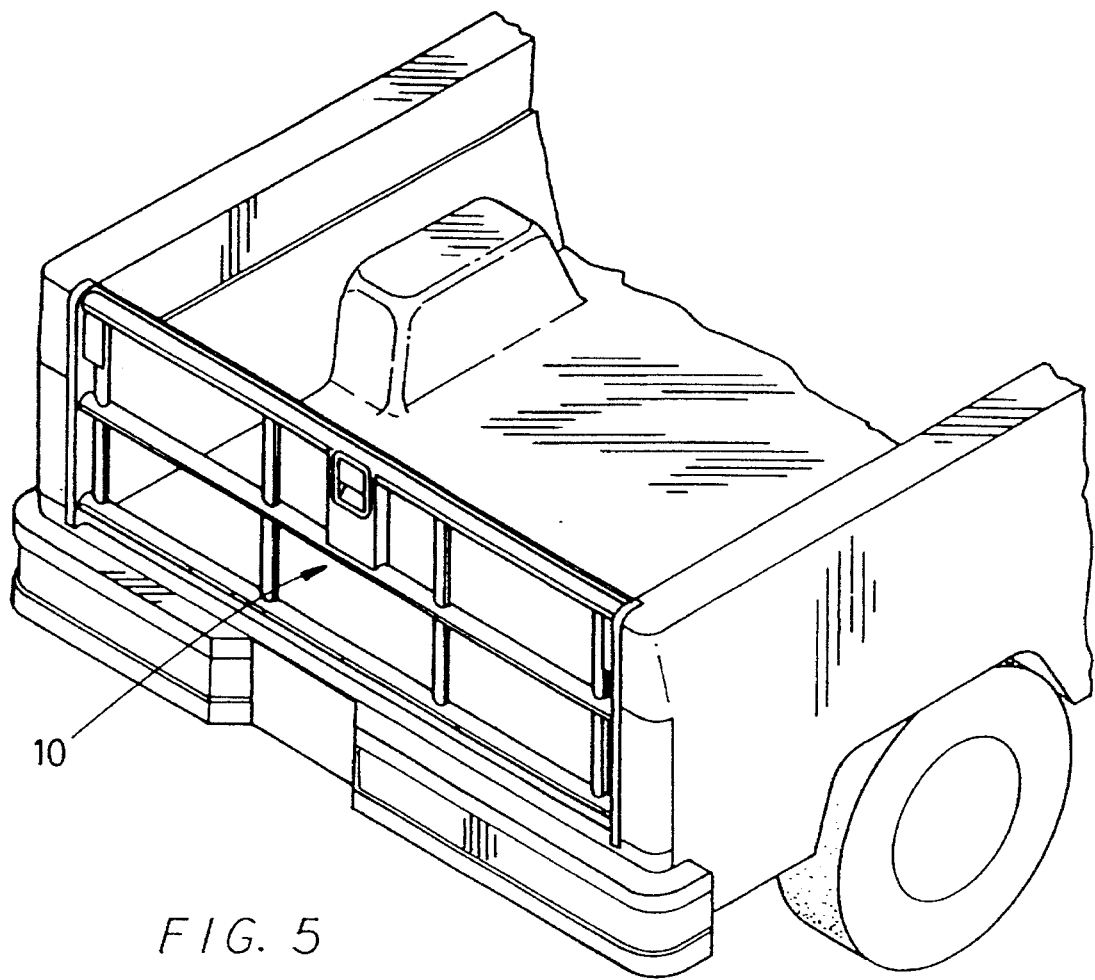
FIG. 5 is a perspective view showing the tailgate attached to the back of a truck bed.

As illustrated in FIG. 1, the tailgate may be provided with an optional solid panel 50, composed of plastic or another durable, rigid material. The panel 50 is preferably corrugated for increased strength, and may be affixed to the tailgate with plastic lugs 52 inserted through holes 51 in the panel 50 into holes 53 in the tailgate, shown in FIG. 4. Alternatively, the panel 50 may be provided with projections which snap-fit into the holes 53 or in the front face of the tailgate. The panel 50 is used for carrying loose loads, such as sand, soil, gravel and the like, and is secured to the front (i.e. the truck bed side) of the tailgate when required. When not required, the panel 50 can be stored behind the back of the seat in the cab, or in any other convenient location.

In use the tailgate 10 operates in conventional fashion. Wind resistance against the tailgate 10 is minimal when the truck is in motion, because the openings defined by the horizontal and vertical members allow air to pass through freely. Wind resistance is further decreased by the use of cylindrical tubes, the configuration of which deflects air around the members.

When long articles are loaded into the truck bed, such as lumber or pipes, the ends of the articles can extend through the spaces defined by the horizontal and vertical members 12,14,16 and 22, and the vertical members 22 will resist lateral shifting of the load while the truck is in motion. The load can be easily tied to the horizontal or vertical members 12,14,16 or 22, to further secure the load and prevent longitudinal shifting within the truck bed. Additionally, long articles supported at their rear ends by the middle member 14 and at their front ends by the truck bed will resist longitudinal shifting because of the downward inclination toward the front wall of the truck bed.

As noted above, the panel 50 can be affixed to the front face of the tailgate to carry loose loads. The tailgate 10 can also be opened in a conventional fashion to facilitate loading of the truck bed and to accommodate large loads that will not pass between the members 12,14,16 and 22.

The invention having been thus described with reference to a preferred embodiment, it will be apparent to those skilled in the art that certain modifications and adaptations may be made without departing from the scope of the invention. For example, the precise number of horizontal or vertical members is variable and may depend upon the nature of the intended load. Although cylindrical tubes are preferred for reduced wind resistance, other shapes are also suitable. The invention contemplates all such embodiments as fall within the scope of the appended claims.

I claim:

1. A tailgate for a truck having side walls and a floor defining a truck bed, comprising a pair of side rails, a top horizontal member, a bottom horizontal member and a middle horizontal member extending between the side rails in substantially evenly spaced relation, the bottom and middle horizontal members being load bearing members, a plurality of vertical members extending between the horizontal members in spaced relation, a plurality of spaces being thereby defined by the horizontal and vertical members whereby a load extending through a space is borne by the bottom or middle horizontal member and prevented from substantial lateral shifting by the vertical members which define the space and confine the load thereto, hinge means adjacent to a bottom of the side rails for mounting the tailgate between rear edges of the side walls, such that the tailgate can swing between an open position substantially parallel to the truck bed and a closed position abutting the rear edge of the side walls, and latch means for latching the tailgate in a closed position.

2. The tailgate defined in claim 1 wherein the horizontal members are cylindrical tubes.

3. The tailgate defined in claim 1 wherein the vertical members are cylindrical tubes.

4. The tailgate defined in claim 1 wherein the horizontal members include a top member, a middle member and a bottom member substantially evenly spaced apart.

5. The tailgate defined in claim 1 wherein a reinforcing brace is affixed to the side rails.

6. The tailgate defined in claim 1 including a housing secured to a top horizontal member containing means for actuating the latch means.

7. The tailgate defined in claim 1 wherein the side rails are each provided with flanges for concealing a clearance between the tailgate and the side walls of the truck.

8. The tailgate defined in claim 1 wherein a hinge socket projects from each side rail in alignment with a bottom horizontal member.

9. The tailgate defined in claim 1 provided with means for securing a rectangular panel to a front face of the tailgate.

10. A tailgate for a truck having side walls and a floor defining a truck bed, comprising a pair of side rails, a plurality of horizontal members extending between the side rails in spaced relation, a plurality of vertical members extending between the horizontal members in spaced relation, hinge means adjacent to a bottom of the side rails for mounting the tailgate between rear edges of the side walls, such that the tailgate can swing between an open position substantially parallel to the truck bed and a closed position abutting the rear edge of the side walls, and latch means for latching the tailgate in a closed position wherein a flange is affixed to a bottom horizontal member to conceal a gap between the tailgate and the truck bed.

11. A truck having side walls and a floor defining a truck bed, including a tailgate comprising a pair of side rails, a top horizontal member, a bottom horizontal member and a middle horizontal member extending between the side rails in substantially evenly spaced relation, the bottom and middle horizontal members being load bearing members, a plurality of vertical members extending between the horizontal members in spaced relation, a plurality of spaces being thereby defined by the horizontal and vertical members whereby a load extending through a space is borne by the bottom or middle horizontal member and prevented from substantial lateral shifting by the vertical members which define the space and confine the load thereto, hinge means adjacent to a bottom of the side rails for mounting the tailgate between rear edges of the side walls, such that the tailgate can swing between an open position substantially parallel to the truck bed and a closed position abutting the rear edge of the side walls, and latch means for latching the tailgate in a closed position.

* * * * *